(No Model.)
W. W. GRISCOM.
SECONDARY BATTERY.
No. 453,695. Patented June 9, 1891.
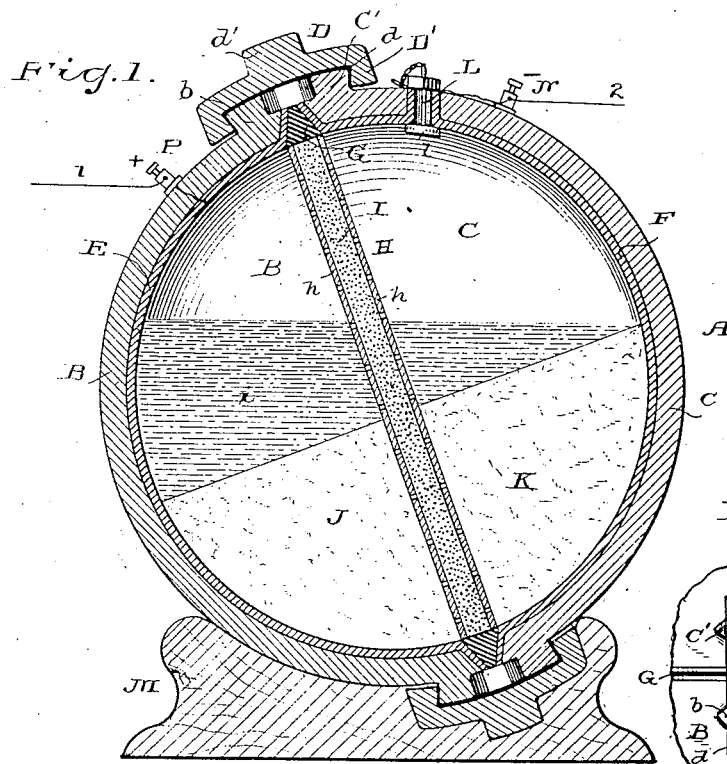
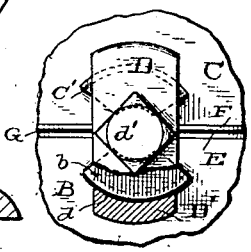
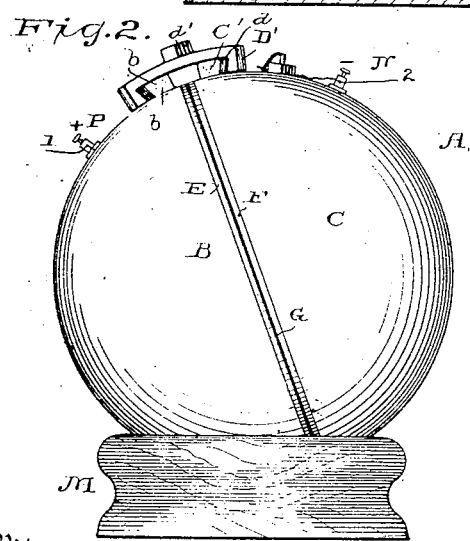
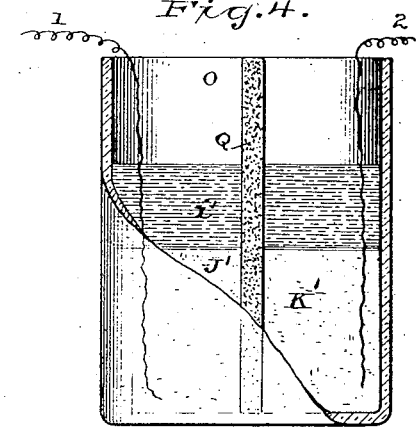
Witnesses
H. A. Lamb
J. J. Jannus
Inventor
William W. Griscom.
By his Attorney
Frankland Jannus

UNITED STATES PATENT OFFICE.

WILLIAM WOODNUTT GRISCOM, OF HAVERFORD COLLEGE, PENNSYLVANIA.

SECONDARY BATTERY.

SPECIFICATION forming part of Letters Patent No. 453,695, dated June 9, 1891.

Application filed December 10, 1887. Serial No. 357,512. (No model.)

*To all whom it may concern:*

Be it known that I, WILLIAM WOODNUTT GRISCOM, a citizen of the United States, residing at Haverford College, in the county of Montgomery, State of Pennsylvania, have invented certain new and useful Improvements in Secondary Batteries, of which the following is a description.

My invention relates to improvements in electric accumulators or secondary batteries; and it consists, broadly, in assembling the component parts of a cell—that is to say, the positive and negative elements, (or multiples thereof,) in a strong closed chamber.

According to my invention the elements are in the form of masses of dough or paste, the positive being a mixture of dilute sulphuric acid and peroxide of lead and the negative being composed of dilute sulphuric acid and spongy lead, the positive and negative material being substantially such as is formed upon the positive and negative plates of a lead battery by the Planté method of forming. The walls of the inclosing chamber are lined with lead or coated with some non-corrosive substance to prevent the acid attacking them, and the said chamber is divided by a porous diaphragm of any suitable insulating material. The masses constituting the elements of the battery are covered with an electrolyte composed of dilute sulphuric acid and charged by the passage of a current therethrough until polarized.

So far the process of charging my improved storage-battery is similar to that in common use, and my novel elements may be used as well in an open as in a closed vessel. When the elements are completely polarized, as evidenced by the giving off of the gases oxygen and hydrogen from the respective masses, the process of charging necessarily terminates, since the further passage of current through the battery would not increase the polarization of the elements and would by electrolytic action decompose and consume the liquid surrounding or covering the elements. The action of the gases oxygen and hydrogen upon the respective elements of a secondary or "polarization" battery polarizes them and places them in the condition in which they are ready to give forth an electric current and are said to be charged. It follows, therefore, that by supplying oxygen to the positive plate and hydrogen to the negative plate the process of polarization will continue as long as the gases are supplied, and that a current may be taken from the said elements so long as oxygen and hydrogen exist in proximity thereto. To attain this further effect, I inclose the positive and negative elements in a very strong receptacle divided by an insulating porous partition, on each side of which one of the active masses is placed. A quantity of dilute sulphuric acid is added, sufficient to cover the masses of active material. It is desirable that the air-space above the normal level of the electrolyte shall be larger on the negative than on the positive side in order to preserve the ratio between and prevent mixing of the gases produced by decomposition of the water in the electrolyte, allowing twice as much space for the hydrogen as for the oxygen to accommodate its greater quantity. The operation of charging as ordinarily understood having been completed, I continue the supply of current until any desired portion of the entire quantity of fluid in the battery has been separated into the gases hydrogen and oxygen, the oxygen remaining on the positive side of the diaphragm and the hydrogen on the negative side. The evolution of great quantities of gas must of course produce an enormous tension within the closed chamber, and said chamber is designed to be of a strength sufficient to withstand the same, as will be hereinafter explained. When the electrolyte has been entirely decomposed the battery is operative as a simple gas-battery, it being well known that the action of the gases oxygen and hydrogen separately upon suitable electrodes will produce a powerful electric current. This action will continue until by their action upon the electrodes the gases recombine and form again into water, replacing the electrolyte. When the discharge of the battery as a gas-battery is completed, the electrolyte will be again in position and the discharge will continue as from an ordinary secondary battery, thus producing a prolonged and intensified effect not heretofore attained.

The details of construction and arrangement will be hereinafter fully pointed out and referred to in the appended claims.

In the drawings illustrating my invention, Figure 1 is a vertical transverse section of a closed battery jar or chamber embodying my invention. Fig. 2 is an elevation thereof. Fig. 3 is a fragmentary detail showing the construction of one of the clamps. Fig. 4 shows another form of the battery jar or chamber.

Similar letters and figures denote like parts throughout.

As illustrated in the drawings, the closed chamber or jar A, containing the elements of my improved secondary battery, is composed of two semi-spherical metallic parts B C, each of which is provided on opposite sides with two or more lugs $b$ $C'$. The lugs are preferably of segmental form and undercut, as shown, and adapted to receive strong metallic clamps D, by which they are joined and forcibly drawn together for uniting the parts of the battery and securely holding them in position.

The depending edges $D'$ of the clamps D are formed somewhat thicker at one side than at the other to correspond with a slightly-distorted elliptical form of the lugs, so that when said lugs are placed in juxtaposition and a rotary movement imparted to the clamps they will slip along the faces of the said lugs and as they are turned will draw them closer together.

The clamps D are lined with insulating material $d$ to prevent electrical connection between the parts B C, and provided with a square portion $d'$ to receive a wrench for turning them into position.

The entire surfaces of the sections B C are desirably provided with a lining E F of lead, although any non-corrosive material or substance will answer the purpose. A washer or gasket G, of vulcanized fiber or other strong insulating material, is formed to fit in and close the joint between the sections B C, which for increased strength and security are tapered inward, so as to be wider on their inner than their outer edges, rendering it impossible that the gasket G should be displaced and blown out by the internal pressure so long as the parts are held together by the clamps D.

The interior of the cell A is divided into two parts by a porous insulating-diaphragm H, which may be of two perforated sheets $h$ of vulcanized fiber, hard rubber, or similar substance, between which is placed a filling I of sand, pumice-stone, or other non-absorbent material. The diaphragm H may be secured to the gasket G and be conveniently removed or replaced together therewith.

J and K represent masses of paste or dough formed, respectively, of dilute sulphuric acid and peroxide of lead and dilute sulphuric acid and spongy lead.

An opening L is formed at any convenient point on the upper portion of the cell A and closed by a valve or plug $l$.

Binding-posts P N are secured upon the exterior of the cell A in any convenient manner and are in electrical connection with the interior lead coating or with the elements themselves. Conductors 1 2 extend from the binding-posts to the source of charging-current or to the breaking-circuit.

When the respective compartments of the cell A have been charged with their respective masses or elements J and K, the parts are united and the cell closed by the application of the clamps G upon the lugs $b$ $C'$, the plug $l$ is loosened and moved to one side of the opening L, through which a sufficient quantity of dilute sulphuric acid is then poured into the cell to completely cover the masses of active material, after which the plug $l$ is replaced in position to close the opening L and the battery is ready for charging. In view of the fact that in the decomposition of water two volumes of hydrogen are evolved for one of oxygen, it is desirable to provide a larger air-space on the negative side of the diaphragm H. This may be accomplished in several ways, a very simple one of which being illustrated.

In the drawings, Figs. 1 and 2, the cell is shown as supported in an inclined position, so that the space above the surface of the electrolyte is unequally divided by the diaphragm H into two compartments, one, the negative or hydrogen side, being about twice the size of the other. A small hollow wooden base or stand M is provided and formed to receive the spherical body A, in which stand said body can be placed in any position, the one shown being merely a convenient one for the purpose in view. It will also be entirely obvious that the diaphragm H may be so curved or positioned that when standing vertically there will be a larger space on one side of it than upon the other.

That part of my invention relating to the use of elements formed of active material in the form of masses of paste does not depend upon the utilization of a spherical or other form of closed chamber, but may be used in a vertical glass jar provided with a porous diaphragm. Such an organization is shown in Fig. 4, O being the jar, Q the porous diaphragm, $J'$ and $K'$ the positive and negative elements formed of masses of active material. $i'$ is the electrolyte with which the elements are covered. The charging and discharging of this form of battery are similar to that of those now in use, and a great improvement is found to result from entirely dispensing with the heavy leaden plates, bars, grids, &c., and the employment of active material in the form of masses of dough or paste readily polarized by the passage of an electric current.

Having described my invention, what I claim, and desire to secure by Letters Patent, is—

1. In secondary batteries, an element-containing receptacle and electrical connections extending thereinto, said receptacle being closed, whereby the gases produced by overcharging may be retained therein, substantially as described.

2. In secondary batteries, an element-containing receptacle, electrical connections extending thereinto, and a diaphragm extending across the same and dividing it into compartments, said compartments being closed, whereby the gases produced by overcharging may be retained therein, substantially as described.

3. A secondary battery comprising two receptacles, one for each of the respective elements, said receptacles consisting partly of metal and partly of non-conducting material, substantially as described.

4. In secondary batteries, a hermetically sealed or closed vessel for containing the elements thereof, consisting partly of metal and partly of porous non-conducting material, substantially as described.

5. In secondary batteries, a closed chamber formed of two receptacles for the respective elements, arranged side by side, and a porous non-conducting diaphragm separating the two receptacles, substantially as described.

6. A vessel for the elements of a secondary battery, consisting of two hollow metallic parts, a porous diaphragm arranged to be interposed between and separate said parts, and means, substantially as described, for uniting the two parts to form a single closed chamber having a porous dividing-wall, substantially as described.

7. A secondary battery comprising a vessel divided into separate compartments by a porous non-conducting diaphragm, a mass of peroxide of lead in one compartment and a mass of spongy lead in the other compartment, electric connections extending from the respective masses to the exterior of the separate portions of the vessel, and an electrolyte common to and covering the masses of active material in both compartments, substantially as described.

8. A cell for containing the elements of a secondary battery, comprising two hollow metallic chambers, a gasket or packing of insulating material formed wider at its inner than at its outer edge and interposed between the metallic chambers, a porous diaphragm separating the chambers, and means, substantially as described, for mechanically uniting the metallic chambers to form a strong closed pressure-proof cell, substantially as described.

9. A cell for containing the elements of a secondary battery, consisting of two semi-spherical metallic parts, a porous non-conducting diaphragm arranged to be inserted between the parts, a suitable packing of insulating material arranged to be placed between the contacting edges of the semi-spheres, and clamping devices, substantially as described, whereby the two parts of the chamber are firmly united and adapted to resist internal pressure, substantially as described.

10. A cell for containing the elements of a secondary battery, comprising two semi-spherical parts, lugs on said parts arranged in positions opposite to each other, suitable clamps for uniting said lugs and joining the parts of the cell, a gasket or packing of insulating material formed wider at its inner than at its outer edge, and a porous non-conducting diaphragm attached to said gasket and centrally dividing the chamber, substantially as described.

11. A cell for containing the elements of a secondary battery, comprising two strong metallic semi-spherical portions provided with a lining of lead or other similar non-corrosive material, a gasket of insulating material formed wider on its inner than upon its outer edge and arranged to fit into and close the joint between the two portions of the cell, substantially as described.

In testimony whereof I hereto affix my signature in presence of two witnesses.

WILLIAM WOODNUTT GRISCOM.

Witnesses:
JOHN RODGERS,
J. GARRETT ASAY.